United States Patent [19]

Hutchins

[11] 4,223,556

[45] Sep. 23, 1980

[54] BODY MOTION COMPENSATION FILTER

[76] Inventor: Roger W. Hutchins, 148 Wimbleton Rd., Islington, Ontario, Canada

[21] Appl. No.: 65,780

[22] Filed: Aug. 13, 1979

[51] Int. Cl.$^3$ .................... G01C 13/00; G01C 23/00
[52] U.S. Cl. ........................................ 73/179; 73/509; 367/130
[58] Field of Search ............... 367/124, 126, 129, 130; 73/178 R, 179, 509

[56] References Cited

U.S. PATENT DOCUMENTS

| | | | |
|---|---|---|---|
| 3,196,691 | 7/1965 | Escobosa | 73/179 X |
| 4,091,356 | 12/1976 | Hutchins | 367/130 |

*Primary Examiner*—James J. Gill
*Attorney, Agent, or Firm*—Rogers, Bereskin & Parr

[57] ABSTRACT

A filter for use in determining the vertical displacement of a body travelling through water relative to a datum such as mean sea level, and having specific application to underwater seismic systems in which a towed body forms a part of equipment for producing profiles of the terrain beneath bodies of water. A vertical displacement signal is produced from a signal, generated by an accelerometer, indicative of the vertical acceleration of the body and a position signal, generated by a pressure transducer, indicative of the vertical displacement of the body, the position signal being corrupted by pressure transducer noise. The filter comprises a first filter portion for receiving the position signal, the first filter portion having a transfer function which is substantially the product of a predetermined gain divided by the pressure transducer gain and a first real rational polynomial function of the form $P_1(s)/Q(s)$. The filter includes a second filter portion for receiving the acceleration signal, the second filter portion having a transfer function which is substantially the product of the predetermined gain divided by the accelerometer gain and a second real rational polynomial function of the form $sP_2(s)/Q(s)$. A summer is provided to produce a signal proportional to the sum of the first and second filter portion signals.

11 Claims, 4 Drawing Figures

BODY MOTION COMPENSATION FILTER

The invention relates to an electronic filter for use in determining the position of a body travelling through water relative to a datum such as mean sea level.

The invention has specific application to an underwater seismic system for use in surveying the terrain under a body of water. Such systems commonly include a towed body, generally referred to as a "fish", which is provided with a sound source and hydrophones or like sound sensors. Very briefly, a sound pulse is generated and directed towards the bottom terrain and a reflected pulse is detected by the hydrophones. From the delay between generation of the sound pulse and detection of the reflected pulse, an estimate of the distance to the reflecting layer of the terrain below may be obtained. By towing the fish at a relatively constant speed and by sampling the distance to the bottom terrain at regular intervals, it is possible with a chart recorder to produce a profile of the bottom terrain.

The quality of the profile obtained may be seriously degraded by vertical movement of the fish during the sampling process. Upward movement of the fish makes the bottom terrain appear farther from the datum; downward movement makes the terrain appear closer. A very significant factor in this respect is heaving of the fish as the towing vessel is buffeted by surface waves. This heaving motion translates onto the chart recorder as an oscillatory pattern which tends to reduce the resolution and usefulness of the profile. U.S. Pat. No. 4,091,356 to Hutchins discloses apparatus for compensating for such heaving motion, including pressure and acceleration transducers for use in determining the instantaneous vertical displacement of the fish with respect to the mean sea level.

Pressure and acceleration transducers presently used are subject to noise problems. This noise tends to degrade the quality of chart recordings in a manner not unlike that of the heaving motion experienced by the fish.

More specifically, the pressure transducer used will generally derive from pressure measurements a position signal indicative of the vertical displacement of the fish with respect to a datum such as mean sea level. The position signal is likely to be subject to noise owing to variations of pressure caused by surface wave action. Since this same wave action buffets the towing vessel, the pressure variations tends generally to have a frequency range similar to that of the heaving motion. This overlap in spectra makes it difficult to attenuate pressure transducer noise without affecting the portion of the position signal reflecting the heaving motion of the fish.

The accelerometer used will generally produce an acceleration signal proportional to the acceleration of the fish along a specific axis through the accelerometer. The axis will normally be arranged to be in a substantially vertical position when the fish is moving smoothly through water so that the acceleration signal is substantially indicative of the vertical acceleration of the fish. Such an accelerometer can generally be expected to have a zero frequency offset corresponding to the effect of gravity on the accelerometer. Because the accelerometer axis tends to tilt from a vertical position as the accelerometer moves with the pitching and rolling of the fish, the gravity offset will at any instant be attenuated by the cosine of the angle by which the axis is tilted from a vertical position: the gravity offset is in effect modulated by the pitching and rolling of the fish.

The modulated gravity offset is an accelerometer noise signal which can be expected to have a very broad frequency range and a significant zero frequency component owing to the fact that over the typical range of angles formed by the accelerometer axis with respect to a vertical position the cosine function produces a positive result. The zero frequency noise component can in practice be the principal portion of the accelerometer noise and can be difficult to remove without distortion of the vertical acceleration signal and ultimately of the displacement signal to be produced.

The frequency spectra of the various signals will vary depending on the physical circumstances in which the fish and the towing vessel are located; however, it has been found practical for design purposes to assume that the period of the heaving motion will be in the order of 6 to 10 seconds with a resultant frequency spectrum centered about 0.125 Hz. As mentioned above, the frequency spectrum of the pressure transducer noise can tend to overlap the frequency of the heaving motion.

A filter constructed according to the invention effectively comprises first and second filter portions whose output signals are added by an electronic summer. The first filter portion is intended to receive and filter the position signal produced by the pressure transducer; the second filter portion, the acceleration signal produced by the accelerometer. The transfer functions of the first and second filter portions are chosen to attentuate the noise characteristic of the signals respectively received, and are related in a manner described more fully below that permits a signal indicative of the body's vertical displacement to be obtained by summing the first and second filter portion output signals.

The words "transfer function" as used in this disclosure and in the appended claims denote the Laplace transform of the impulse response of a filter or like electronic circuit. The transfer functions dealt with will be real, rational, polynominal functions in the complex Laplace variables. Transfer function "zeroes" and "poles" will consequently be the values of the Laplace variable s at which the numerator and denominator polynomials of the transfer function respectively assume values of 0. It will be appreciated that such transfer functions are realizable using conventional filter design techniques.

According to the invention, the first and second filter portions will respectively have transfer functions $T_1(s)$ and $T_2(s)$, of the following general form:

$$T_1(s) = \frac{M}{K_1} \frac{P_1(s)}{Q(s)}$$

$$T_2(s) = \frac{M}{K_2} \frac{sP_2(s)}{Q(s)}$$

In the above, M is a gain factor which may be freely chosen; $K_1$ is the accelerometer gain, the constant of proportionality relating the body's acceleration to the accelerometer output signal; and, $K_2$ is the pressure transducer gain, the constant of proportionality relating the vertical displacement of the body to the pressure transducer signal. $P_1(s)$, $P_2(s)$ and $Q(s)$ are polynomial functions in the complex variables. Because the transfer functions $T_1(s)$ and $T_2(s)$ are constrained to be real, rational, polynomial functions, the coefficients of $P_1(s)$, $P_2(s)$ and $Q(s)$ will of necessity be real numbers. The degree of $Q(s)$ is an integer n greater than 2, and the degree of each of $P_1(2)$ and $P_2(s)$ is less than n. $P_1(s)$ and $P_2(s)$ are further constrained to satisfy the relationship:

$$P_1(s) + s^3 P_2(s) = Q(s)$$

If the Laplace transform of the body's vertical displacement with respect to the datum is a function $Z(s)$ and consequently that of the acceleration of the body's $s^2 Z(s)$, then the Laplace transform of the filter output signal $E(s)$ will be given by:

$$E(s) = K_1 Z(s) T_1(s) + K_2 s^2 Z(s) T_2(2)$$

Simple algebraic manipulation of the expression above leads to the expression:

$$E(s) = M\, Z(s)$$

Thus, a signal proportional to the vertical displacement of the fish will appear undistorted at the filter output.

The pressure transducer noise received by the first filter portion produces at the output of the filter a noise signal whose Laplace transform is the product of the transform of the pressure transducer noise and the transfer function $T_1(s)$. If the zeroes of $Q(s)$ are chosen so that a transfer function $1/Q(s)$ were to have a 20n db/decade roll-off in the noise frequency range, then, because the degree of $P_1(s)$ is less than the degree of $Q(s)$, the magnitude of the output noise signal corresponding to pressure transducer noise may be expected to drop at least 20 db/decade with increasing frequency. If the zeroes of $P_1(s)$ are now chosen so that the magnitude of $P_1(s)/Q(s)$ is less than 1 for $s = jw$ where w is any radial frequency in the frequency range of the pressure transducer noise, then an increase in the signal to pressure transducer noise ratio may be expected.

The forms of $P_1(s)$ and $Q(s)$ will be completely specified by the choice of zeroes above. $P_2(s)$ will also be completely specified, owing to the relationship among $P_1(s)$, $P_2(s)$ and $Q(s)$, namely, $P_1(s) + s^3 P_2(s) = Q(s)$. However, if the zeroes of the polynomial $Q(s)$ are chosen to be non-zero then the second filter portion transfer function $T_2(s)$ will be constrained to have a zero frequency zero. Consequently, zero frequency components corresponding to the effect of gravity on the accelerometer will be removed by the second filter portion.

The invention will be better understood with reference to drawings in which.

Figure 1:
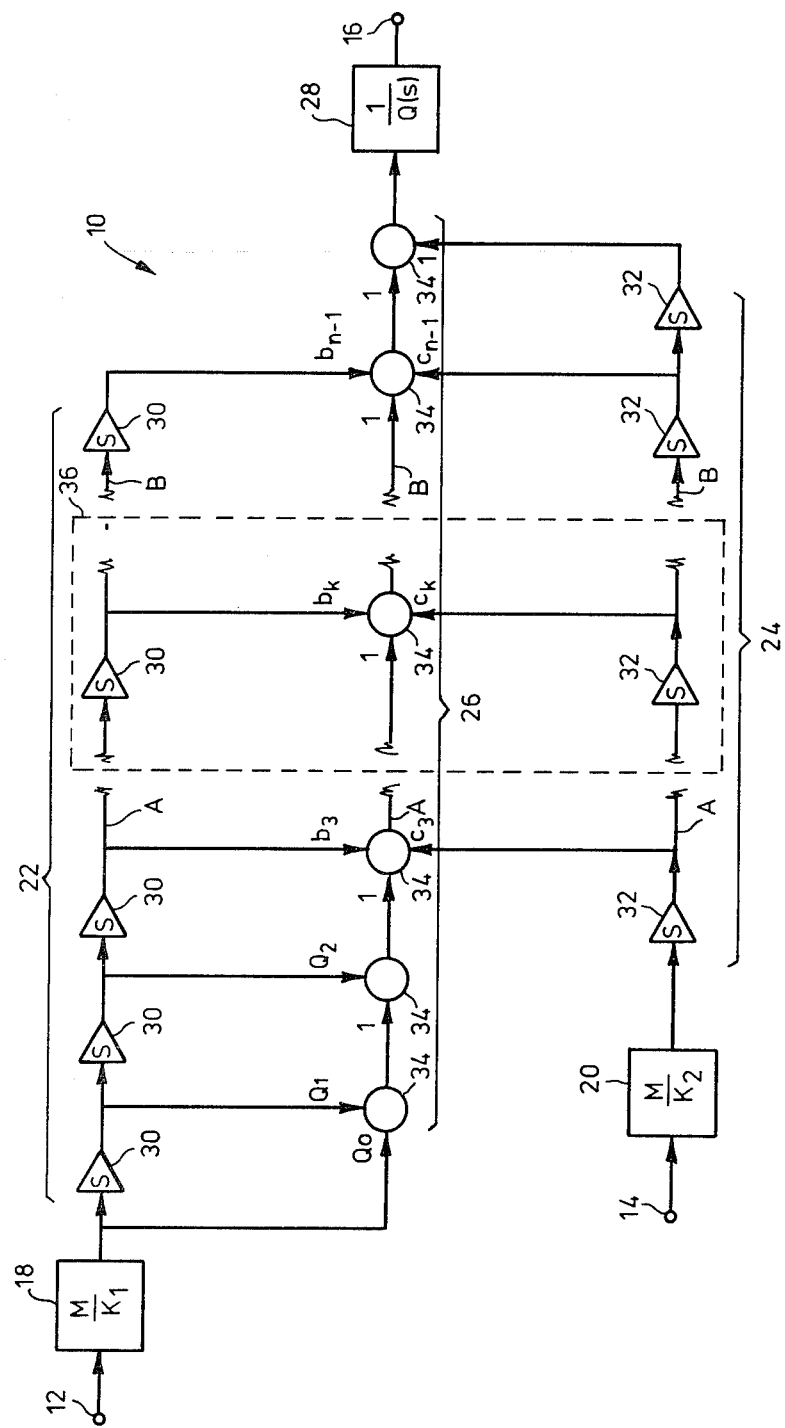
FIG. 1 is a schematic representation of a filter network which realizes transfer functions related according to the invention.

Reference is made to FIG. 1 which shows a filter 10 having first and second input terminals 12, 14 for respectively receiving position and acceleration signals as described above, and an output terminal 16. The filter 10 comprises first and second scaling means 18, 20; first and second differentiation networks 22, 24; a summing network 26; and a filter portion 28 having a transfer function $1/Q(s)$, where $Q(s)$ is a polynomial function of degree n, as described above.

$Q(s)$ will generally have the following form:

$$Q(s) = a_0 + a_1 s + a_2 s^2 + \ldots + a_k s^k + \ldots + a_{n-1} s^{n-1} + s^n$$

where the coefficients generally denoted by $a_k$ are real numbers. The coefficients of $Q(s)$ are obtained by first choosing the zeroes of $Q(s)$ so that the transfer function $1/Q(s)$ has a 20n db/decade roll-off in the frequency range of the pressure transducer noise, and then producing $Q(s)$ by expanding the product of n terms each comprising a different zero subtracted from the complex variable s. With the zeroes and coefficients of $Q(s)$ specified in this manner, the transfer function $1/Q(s)$ may be realized by using conventional filter design techniques.

The scaling means 18, 20 have transfer functions which are respectively a constant $M/K_1$ and a constant $M/K_2$, as described above. The purpose of the first and second scaling means 18, 20 is to compensate for the different scaling provided by the accelerometer and the pressure transducers. The transform of the output signal of the first scaling means 18 will be $MZ(s)$, and that the output signal of the second scaling means 20, $s^2 MZ(s)$. The signals will of course be subject to noise.

The first differentiation network 22 comprises $n-1$ unity gain differentiators 30 connected in series to produce successive derivatives of the scaled position signal. The second differentiation network 24 comprises $n-2$ unity gain differentiators 32 connected in series to produce successive derivatives of the scaled acceleration signal. Each of the differentiators 30, 32 has a transfer function which is simply the complex variable s.

The summing network 26 comprises n individual summers 34 which are connected as shown to produce a weighted sum of the scaled pressure transducer signal, and the output signals of each of the differentiators 30, 32. The weighting used is indicated by constants adjacent to the input terminals of the summers 34, the input terminals being generally indicated by arrows contacting the summers 34.

It will be appreciated that the degree n of the polynomial $Q(s)$ has not been specified so that the filter 10 provides very general means for realizing transfer functions related according to the invention. Consequently, the entirety of the filter 10 is not shown and a filter portion 36 is provided in FIG. 1 as one of $n-5$ similar filter portions connected series between points A and points B of the filter 10.

Weighting constants $a_0$, $a_1$ and $a_2$ shown in FIG. 1 are the same $a_0$, $a_1$ and $a_2$ which are coefficients of the polynomial $Q(s)$. The weighting constants denoted generally by $b_k$ and $c_k$ where k assumes values ranging from 3 up to $n-1$ are related by the relationship $b_k + c_k = a_k$ where $a_k$ once again denotes each of the coefficients of the polynomial $Q(s)$.

The differentiation network 22 in combination with the summing network 26 constitutes a filter portion that realizes a transfer function $P_1(s)$; the second differentiation network 24 in combination with the summing network 26 constitutes a filter portion that realizes a transfer function the polynomial $sP_2(s)$, as described above. The constants $b_k$ will be chosen to provide the polynomial $P_1(s)$ with appropriate zero values. The constants $c_k$ will be completely specified by the choice of the constants $b_k$. It will now be apparent that the transfer function $T_1(s)$ is realized between the output terminal 16 and the input terminal 12; and the transfer function $T_2(s)$, between the output terminal 16 and the input terminal 14.

Figure 2:
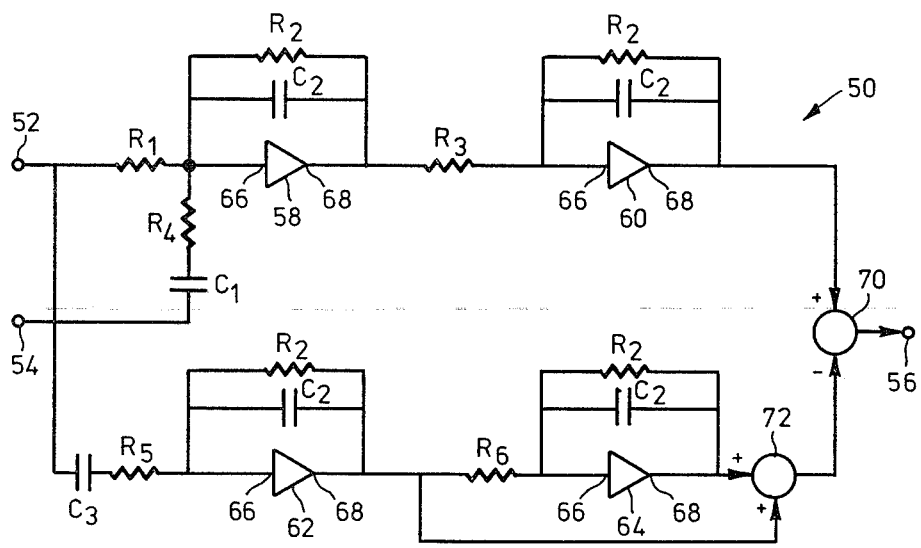
FIG. 2 is a schematic representation of a practical filter constructed according to the invention.

Although the filter 10 could be realized using frequency limited differentiators for the differentiation networks 22, 24 and conventional summing circuits for the summing network 26, in practice an equivalent circuit, such as that shown in FIG. 2, is preferably used. FIG. 2 shows a filter 50 having input terminals 52, 54 for respectively receiving position and acceleration signals as described above, and an output terminal 56. The filter 50 is intended to realize between the output terminal 56 and the input terminal 52 a transfer function $T_1(s)$ as described above, and between output terminal 56 and input terminal 54 a transfer function $T_2(s)$, as described above, such that:

$$P_1(s) = 3w_0s^2 + 3w_0^2s + w_0^3;$$
$$P_2(s) = s; \text{ and}$$
$$Q(s) = (s + w_0)^3$$

where $w_0$ is a positive, real constant. The constant $w_0$ represents the radial frequency at which a transfer function $1/Q(s)$ begins to have a 60 db/decade roll-off. It will be appreciated that $P_1(s)$, $P_2(s)$ and $Q(s)$ satisfy the relationship $P_1(s)+s^3P_2(s)=Q(s)$.

The filter 50 comprises four operational amplifiers 58, 60, 62, 64 having inverting terminals 66 and output terminals 68. For the sake of clarity only those impedances connected to the inverting terminal 66 and output terminals 68 are shown. The filter 50 also includes first and second summers 70, 72 for producing weighted sums of signals, the weighting having magnitude 1 and sign as indicated in FIG. 2 beside input terminals marked by arrows contacting the summers 70, 72.

With M, $K_1$, $K_2$, and $w_0$, defined as above, and resistor values $R_2$ and $R_3$ freely chose, the following set of component values will enable the filter 50 to realize the transfer functions $T_1(s)$ and $T_2(s)$, as defined:

$$R_1 = \frac{K_1 R_2^2}{M R_3} \quad R_4 = \frac{K_2 w_0^2 R_2^2}{M R_3} \quad R_5 = \frac{K_o R_2}{3M}$$
$$R_6 = 3R_2 \quad C_1 = \frac{M R_3}{K_2 w_0^3 R_2^2} \quad C_2 = \frac{1}{w_0 R_2}$$
$$C_3 = \frac{3M}{K_o w_o R_2}$$

The amplifiers 58 and 60 present to the position signal received at the terminal 52 a first low pass filter, whose transfer function comprises two poles substantially at $s=-w_0$. The amplifier 62 presents to the position signal received at the terminal 52 a first band pass filter, whose transfer function comprises a zero at $s=0$ and two poles substantially at $s=-w_0$. The filter 64 effectively provides a second low pass filter, whose transfer function comprises a pole substantially at $s=-w_0$, for filtering the first band pass filter signal. The second summer 72 produces a signal proportional to a weighted sum of the first and second low pass filter signals, and the first band pass filter signal, the weighting being as discussed above. These elements effectively constitute a first filter portion as described above.

The amplifier 58 presents to the acceleration signal received at the terminal 54 a second band-pass filter, whose transfer function comprises a zero at $s=0$ and two poles substantially at $s=-w_0$. The amplifier 60 effectively constitutes a third low pass filter, whose transfer function comprises a pole at $s=-w_0$ for filtering the second band-pass filter signal. This effectively constitutes a second filter portion as described above.

The poles associated with the transfer functions realized by the filter 50 were chosen to be equal, negative real constants, namely, $-w_0$. It will be appreciated that transfer function poles for filters constructed according to the invention may generally be chosen from the complex s plane provided that the requirements specified in the disclosure are observed.

Figure 3:
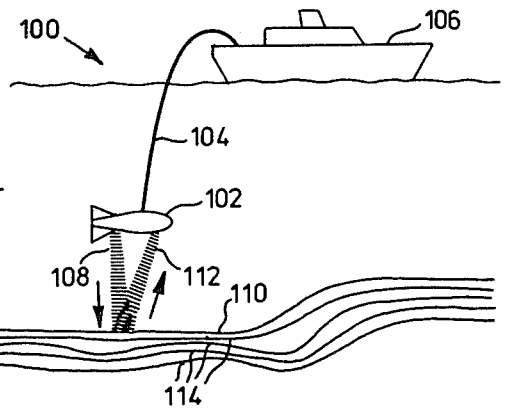
FIG. 3 is a diagrammatic representation of an underwater seismic system in association with which a filter constructed according to the invention is intended to be used.

FIG. 3 shows an underwater seismic system 100 comprising a body 102 being towed with a cable 104 from a towing vessel 106. A sound pulse 108 is shown emanating from the towed body 102 and travelling towards a reflecting layer 110. The reflecting layer 110 causes a reflected sound pulse 112 to be directed upwardly toward the towed body 102. Further layers 114 would also produce reflected pulses, but the latter are not shown for the sake of clarity.

Figure 4:
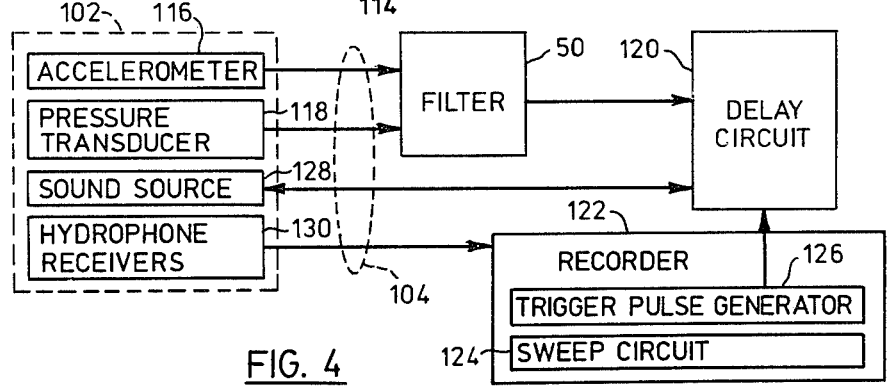
FIG. 4 is a schematic representation of the filter of FIG. 2 in use in the underwater seismic system of FIG. 3.

FIG. 4 shows the filtered 50 of FIG. 2 connected to an accelerometer 116, a pressure transducer 118, and a delay circuit 120, all of which are included in the underwater seismic system 100. The accelerometer 116 and the pressure transducer 118 are physically located within the body 102 and respectively produce acceleration and pressure signal as described above.

The underwater seismic system 100 includes a recorder 122 which is a conventional chart or drum recorder of a type having a repetitive sweep provided by sweep circuit 124. Each time the sweep circuit 124 initiates a sweep across the chart (not shown) a trigger signal is generated by a trigger signal generator 126.

The delay circuit 120 receives the trigger signal, delays it in time, and then couples the trigger signal via the cable 104 to a sound source 128 located in the body 102. The delayed trigger signal activates the sound source 128 causing it to generate a sound pulse such as the pulse 108 of FIG. 3.

Reflected pulses such as the pulse 112 of FIG. 3 are detected at intervals by hydrophones receivers 130 which generate response signals indicating that reflected pulses have been detected. The amplitude and duration of each response signal will generally correspond to the amplitude and duration characteristic of each reflected sound pulse; however, variations in the characteristics of the successive response signals will normally not affect the operation of the underwater seismic system 100 in a material way.

Each response signal is received by the recorder 122 which then causes a point to be plotted by an electrically activated pen (not shown) that regularly sweeps the recorder chart (not shown). In effect, the recorder mechanically computes and plots the time elapsed from the generation of the trigger signal to the receipt by the recorder 28 of the response signal. The portion of the chart recording so produced will also be indicative of the distance to the reflecting layer giving rise to the reflected sound pulse, since the average distance to the reflecting layer during the travel time of the sound pulse and reflected sound pulse will be proportional to the time elapsed, the constant of proportionality being the velocity of sound divided by two. In a similar manner, the recorder 122 simultaneously plots from other response signals the distances to other reflecting layers.

The extent of the delay between the initiation of the sweep by the sweep circuit 124 and firing of the sound source 128 depends on the vertical displacement signal produced by the filter 50. The delay circuit 120 receives the displacement signal and delays the trigger signal by a fixed period plus a varying period, the varying period being proportional to the displacement signal. Thus, as the towed body 102 is displaced downwardly, the delay in the firing of the sound source 128 is increased; as the towed body 102 moves upwardly, the delay is decreased and the firing is effectively advanced. Changes in the delay in firing of the sound source 128 will be related to changes in the vertical displacement of the body 102 by a constant of proportionality which is twice the reciprocal of the velocity of sound in water. With such a constant of proportionality, the vertical displacement of the towed body 102 will appear to be the same at successive firings, for the purposes of the recorder 122.

A more detailed description of apparatus comprising an underwater seismic system such as the underwater seismic system 100 may be obtained from the Hutchins patent referred to above.

What I claim as my invention is:

1. A filter for use in determining the vertical displacement of a body travelling through water relative to a datum, the body having an accelerometer with a predetermined accelerometer gain that produces a signal indicative of the vertical acceleration of the body, the body having a pressure transducer with a predetermined pressure transducer gain that produces a position signal, corrupted by pressure transducer noise, indicative of the vertical displacement of the body with respect to the datum, the filter comprising:
    (a) a first filter portion, connectable to the pressure transducer to produce a filtered position signal, the first filter portion having a transfer function which is substantially the product of a predetermined gain divided by the pressure transducer gain and a first real rational polynomial function of the form $P_1(s)/Q(s)$;
    (b) a second filter portion, connectable to the accelerometer to produce a filtered acceleration signal, the second filter portion having a transfer function which is substantially the product of the predetermined gain divided by the accelerometer gain and a second real rational polynomial function of the form $sP_2(s)/Q(s)$; and,
    (c) a first summer connected to the first and second filter portions to produce a signal proportional to the sum of the first and second filter portion signals, where:
    $P_1(s)$, $P_2(s)$ and $Q(s)$ are predetermined real polynomial functions in the complex variable s; p2 the degree of $Q(s)$ is an integer n greater than 2, and the degree of each of $P_1(s)$ and $P_2(s)$ is less than n;
    the magnitude of $P_1(s)/Q(s)$ is less than 1 for $s=jw$ when w is any radial frequency within the frequency range of the pressure transducer noise; and
    $P_1(s)$ and $P_2(s)$ satisfy the relationship $P_1(s)+S^3P_2(s)=Q(s)$.

2. A filter as claimed in claim 1 in which the zeroes of $Q(s)$ are such that a transfer function $1/Q(s)$ has a 20n db/decade roll-off in the frequency range of the pressure transducer noise.

3. A filter as claimed in claim 2 in which the zeroes of $Q(s)$ are non-zero.

4. A filter as claimed in claim 3 in which the zeroes of $Q(s)$ lie in the closed left-hand complex s plane.

5. A filter as claimed in claim 2 in which the zeroes of $Q(s)$ lie in the open left-hand complex s plane.

6. A filter as claimed in claim 2 in which the zeroes of $Q(s)$ are negative, real numbers.

7. A filter as claimed in claim 6 in which the degree n of $Q(s)$ is 3.

8. A filter as claimed in claim 7 in which the zeroes are substantially equal to one another.

9. A filter as claimed in claim 8 in which:

$$P_1(s) = 3w_0s^2 + 3w_0^2s + w_0^3;$$
$$P_2(s) = s;\text{ and}$$
$$Q(s) = (s + w_0)^3;$$

where, $w_0$ is a predetermined positive real constant.

10. A filter as claimed in claim 9 in which the first filter portion comprises:
    a first low pass filter, whose transfer function comprises two poles substantially at $s=-w_0$, for producing a filtered position signal;
    a first band-pass filter, whose transfer function comprises a zero at $s=0$ and two poles substantially at $s=-w_0$ for producing a filtered position signal;
    a second low pass filter, whose transfer function comprises a pole substantially at $s=-w_0$, connected to the first band-pass filter to produce a filtered, first band-pass filter signal; and
    a second summing means for producing a signal proportional to a weighted sum of the first and second low pass filter signals, and the first band-pass filter signal.

11. A filter as claimed in claim 10 in which the second filter portion comprises:
    a second band-pass filter, whose transfer function comprises a zero at $s=0$ and two poles substantially at $s=-w_0$, for producing a filtered acceleration signal; and
    a third low pass filter, whose transfer function comprises a pole at $s=-w_0$, connected to the second band-pass filter to producing a filtered second band-pass filter signal.

* * * * *